July 29, 1947. J. MUISE 2,424,940
CLAMPING DEVICE
Filed June 7, 1946
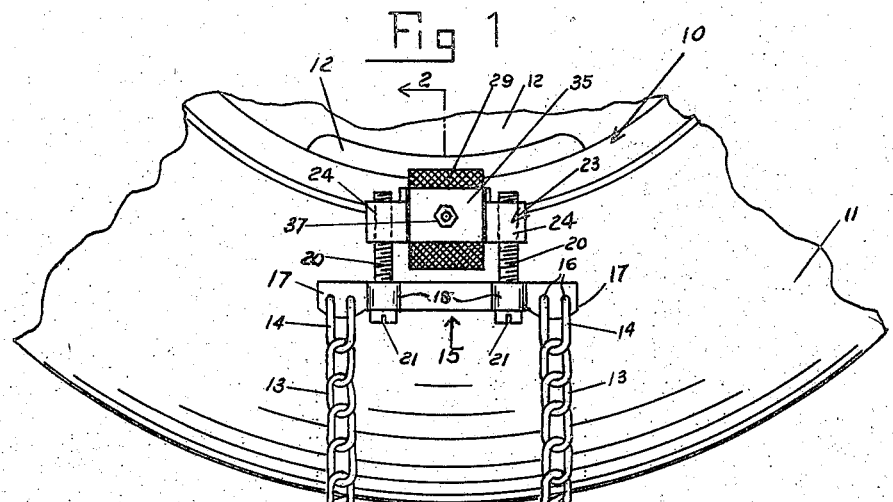
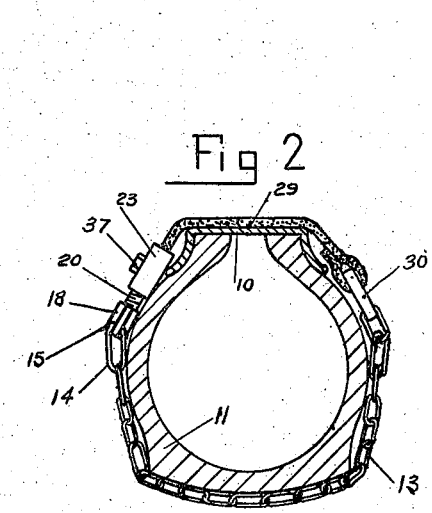
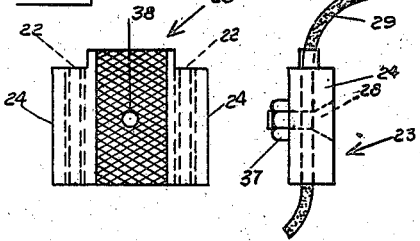
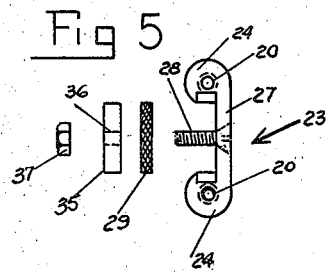
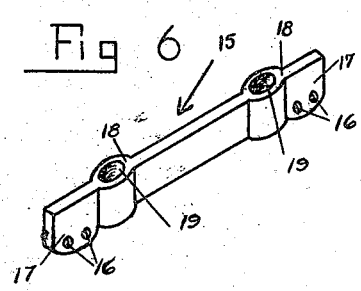
Inventor
JOHN MUISE
By McMorrow, Berman and Davidson
Attorneys Patented July 29, 1947

2,424,940

UNITED STATES PATENT OFFICE 2,424,940

CLAMPING DEVICE

John Muise, Everett, Mass.

Application June 7, 1946, Serial No. 675,228

3 Claims. (Cl. 152—233)

This invention relates to a clamping device, and more particularly to a clamping device for strap-type skid chains for motor vehicles.

A primary object of this invention is the provision of an improved device adapted for the securing of strap-type skid chains to a vehicle wheel characterized by means whereby slack in the chain may be substantially precluded.

A further object of the invention is the provision of such a device having means whereby each strap-type chain may be readily adjusted to a desired degree of tension about the wheel, in such manner that slack, and consequent noise occasioned thereby in the passage of the vehicle is substantially precluded.

Still other objects reside in the combinations of elements, arrangements of parts, and features of construction, all as will be more fully pointed out hereinafter and shown in the accompanying drawings, wherein there is disclosed a preferred embodiment of this inventive concept.

In the drawings:

Figure 1 is a fragmentary view of a vehicle wheel showing the clamp of the instant invention as applied thereto.

Figure 2 is a sectional view taken substantially along the line 2—2 of Figure 1, as viewed in the direction indicated by the arrows.

Figure 3 is a plan view of a constructional detail.

Figure 4 is an end view of the device disclosed in Figure 3, certain additional portions of the mechanism being shown in association therewith, and concealed parts being indicated in dotted lines.

Figure 5 is an exploded top plan view of the assembly shown in Figure 4.

Figure 6 is a perspective view of a constructional detail.

Referring now to the drawings, there is generally indicated at 10 the rim of a vehicle wheel provided with a tire 11. The wheel 12 is provided with suitable conventional slotted apertures 12'.

The device of the instant invention comprises spaced pairs of chain links 13 adapted to extend around the outer periphery of the tire, and having the end links 14 thereof secured in suitable apertures in the ends of a bar generally indicated at 15. The apertures are designated by the reference character 16.

As best shown in Figure 6, the bar 15 includes extending ears 17, having the apertures 16 therein, and enlarged portions 18, provided with vertical central bores 19. The bores 19 accommodate screws 20 having heads 21 of a diameter greater than that of the bores in such manner as to block the passage of the heads of the screws into the bores. The upper ends of the screws 20 engage suitable threaded apertures 22 in a clamping plate generally indicated at 23, having enlarged end portions 24, as best shown in Figure 5, to provide threaded bores for the passage of the screws 20. The relatively flat central portion 27 of the member 23 is apertured to receive the countersunk head of a screw 28, which passes through a suitable aperture in a belt member 29, adapted to extend through the aperture 13 and have its opposite end secured, as by any suitable securing means, such as an apertured bar 30 to the opposite end of the chain links 13.

A clamping plate 35 having an aperture 36 therein is adapted to be positioned over the belt 29, the end of the screw 28 passing through the aperture 36, and a lock nut 37 being provided to secure the parts in secure clamping assembly. Preferably, the belt is provided with an aperture 38, as shown in Figure 4, to permit the passage of a screw 28 therethrough, or, alternatively, if desired, a series of apertures may be formed to accommodate varying thicknesses of rims.

From the foregoing the operation of the device should now be readily understandable. When it is desired to apply a link 13 to the tire, the belt 29 may be removed and inserted through the aperture 13 by disassembly of the nut 37 and its associated clamping plate 35 from the screw 28. After application of the assembly to the wheel in the manner shown in Figure 1, the entire construction may be readily tightened by means of a screw driver applied to appropriate slots in the heads 21 of the bolts 20, which, by their engagement with the threaded bores in the enlarged extremities 24 of the member 23, will serve effectively to tighten the chain to any desired degree about the tire 11.

From the foregoing it will now be seen that there is herein provided a device which accomplishes all the objects of this invention, and others, including many advantages of great practical utility and commercial importance.

Since many embodiments may be made of this inventive concept, and since many modifications may be made in the embodiment hereinbefore shown and described, it is to be understood that all matter herein is to be interpreted merely as illustrative and not in a limiting sense.

I claim:

1. In a clamp for strap-type tire chains, a transverse bar having smooth vertical bores therethrough, chains secured to said bar, a headed screw member passed through said bores, a transverse member having threaded bores therein aligned with said first-mentioned bores, a strap releasably secured to said transverse member for extending over the rim of a wheel, and a member secured to the opposite end of said strap for engagement with the opposite ends of said chains.

2. In a clamp for strap-type tire chains, a transverse bar having smooth vertical bores therethrough, chains secured to said bar, a headed screw member passed through said bores, a transverse member having threaded bores therein aligned with said first-mentioned bores, a strap releasably secured to said transverse member for extending over the rim of a wheel, a member secured to the opposite end of said strap for engagement with the opposite ends of said chains, said strap being positioned in a vertical slot in said transverse member, and screw means securing said strap in said slot.

3. In a clamp for strap-type tire chains, a transverse bar having smooth vertical bores therethrough, chains secured to said bar, a headed screw member passed through said bores, a tranverse member having threaded bores therein aligned with said first-mentioned bores, a strap releasably secured to said transverse member for extending over the rim of a wheel, a member secured to the opposite end of said strap for engagement with the opposite ends of said chains, said strap being positioned in a vertical slot in said transverse member, and screw means securing said strap in said slot, said screw means including a bolt, a clamping plate, and a nut for said bolt.

JOHN MUISE.